United States Patent
Sugano et al.

(10) Patent No.: US 8,527,171 B2
(45) Date of Patent: Sep. 3, 2013

(54) REACTION FORCE IMPARTING SYSTEM AND REACTION FORCE IMPARTING METHOD OF VEHICLE ACCELERATOR PEDAL

(75) Inventors: Takeshi Sugano, Yokohama (JP); Yasuhisa Taira, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 342 days.

(21) Appl. No.: 12/725,905

(22) Filed: Mar. 17, 2010

(65) Prior Publication Data

US 2010/0250085 A1    Sep. 30, 2010

(30) Foreign Application Priority Data

Mar. 27, 2009   (JP) ................................. 2009-079822
Nov. 27, 2009   (JP) ................................. 2009-269902

(51) Int. Cl.
   *G06F 19/00*   (2011.01)
(52) U.S. Cl.
   USPC .......................................................... 701/70
(58) Field of Classification Search
   USPC .......................................................... 701/70
   See application file for complete search history.

(56) References Cited

U.S. PATENT DOCUMENTS

| | | | |
|---|---|---|---|
| 7,417,532 B2* | 8/2008 | Grill et al. ..................... | 340/439 |
| 2003/0135317 A1* | 7/2003 | Hijikata et al. ................ | 701/70 |
| 2005/0279554 A1* | 12/2005 | Kobayashi et al. ........... | 180/197 |
| 2007/0213916 A1* | 9/2007 | Sugano et al. .................. | 701/96 |
| 2009/0105953 A1* | 4/2009 | Sugano et al. ................ | 701/301 |

FOREIGN PATENT DOCUMENTS

| | | |
|---|---|---|
| CN | 101032956 A | 9/2007 |
| EP | 1 327 552 A2 | 7/2003 |
| JP | 2003-260951 A | 9/2003 |
| JP | 2004-314871 A | 11/2004 |
| JP | 2005-132225 A | 5/2005 |
| JP | 2007-182196 A | 7/2007 |
| JP | 2007-269307 A | 10/2007 |

* cited by examiner

*Primary Examiner* — James Trammell
*Assistant Examiner* — Jerrah Edwards
(74) *Attorney, Agent, or Firm* — Foley & Lardner LLP

(57) ABSTRACT

A reaction force imparting system of a vehicle accelerator pedal includes a running circumstance detection apparatus that detects two or more running circumstances; a reaction force generation apparatus; and a reaction force correction apparatus. Depending on the running circumstance, the reaction force generation apparatus generates reaction force for an accelerator pedal in a returning direction thereof based on a predetermined reaction force target value, wherein the reaction force target value is differentiated according to each of the running circumstances. The reaction force correction apparatus makes correction to reduce the reaction force currently generated by the reaction force generation apparatus in a case where it is predicted that the reaction force target value is increased by a change of the running circumstance, and a difference between the reaction force target value corresponding to the running circumstance after the change and the currently generated reaction force is less than a predetermined difference.

13 Claims, 10 Drawing Sheets

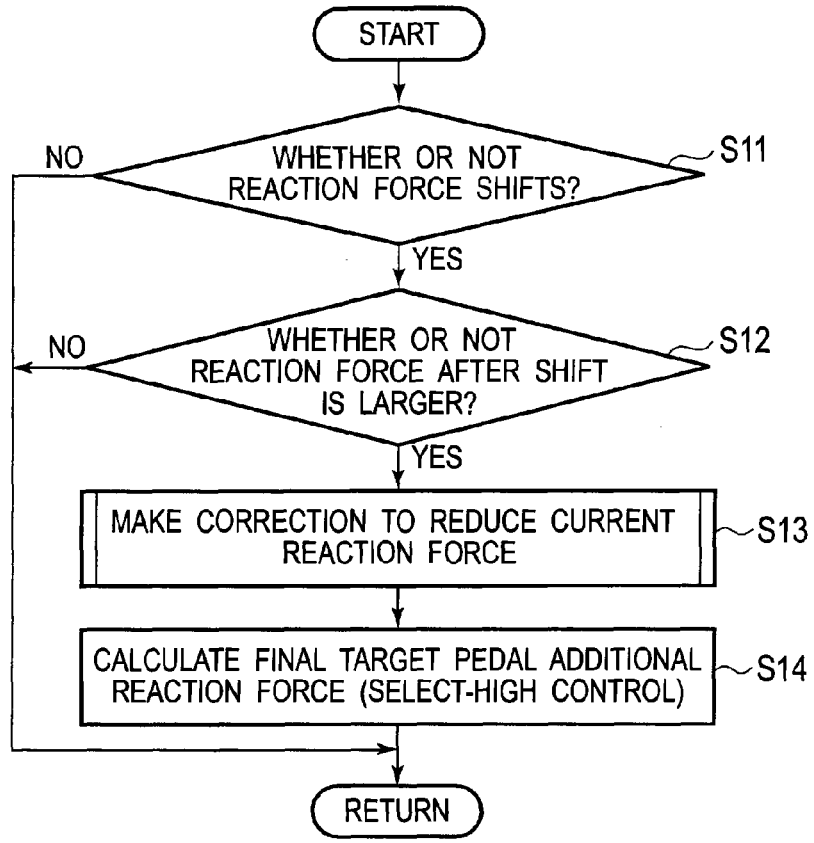
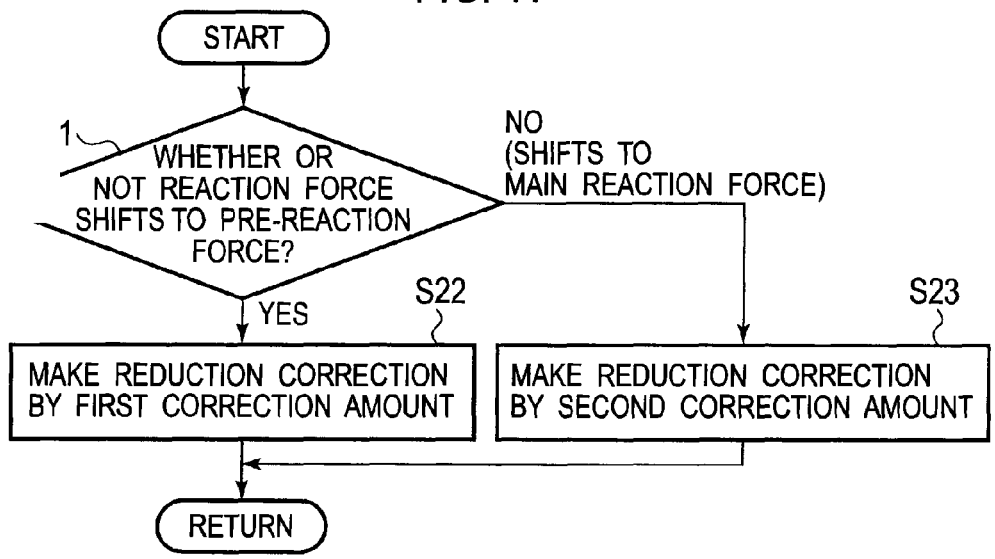

REACTION FORCE IMPARTING SYSTEM AND REACTION FORCE IMPARTING METHOD OF VEHICLE ACCELERATOR PEDAL

BACKGROUND OF THE INVENTION

1. Field of the Invention

The present invention relates to a system for controlling reaction force of an accelerator pedal operated by tread force of a driver, and to a control method of the system.

2. Description of the Related Art

In Japanese Patent Unexamined Publication No. 2003-260951, in the case where a vehicle speed has exceeded a preset speed, reaction force is imparted to an accelerator pedal, and a driver is notified that the vehicle speed has exceeded the set speed.

BRIEF SUMMARY OF THE INVENTION

Incidentally, besides the technology mentioned in Japanese Patent Unexamined Publication No. 2003-260951, there is a technology for controlling the reaction force of the accelerator pedal, for example, based on running resistance when the vehicle corners. As described above, the reaction force of the accelerator pedal is controlled in response to a variety of running circumstances (the vehicle speed, the running resistance when the vehicle corners, and the like).

Here, in the case where the reaction force control for the accelerator pedal is differentiated for each of the running circumstances, the reaction force control is differentiated when the running circumstances are changed, and accordingly, the reaction force to be imparted to the accelerator pedal is also changed. However, even if the reaction force to be imparted to the accelerator pedal is changed by the fact that the running circumstances are changed, if the change of the reaction force is small, then the change of the reaction force is less likely to be transmitted to the driver. In this case, it is apprehended that the driver may not be able to recognize the change of the running circumstances.

The present invention has been made in consideration of the problem inherent in the related art, which is as described above. It is an object of the present invention to provide a reaction force imparting system and reaction force imparting method of an accelerator pedal, which accurately transmit the change of the running circumstances to the driver through the reaction force to be imparted to the accelerator pedal.

The first aspect of the present invention provides a reaction force imparting system of a vehicle accelerator pedal, comprising: a running circumstance detection apparatus that detects two or more running circumstances of a vehicle; a reaction force generation apparatus that, depending on the running circumstance detected by the running circumstance detection apparatus, generates reaction force for an accelerator pedal in a returning direction thereof based on a predetermined reaction force target value, wherein the accelerator pedal is operated by tread force of a driver, and the reaction force target value is differentiated according to each of the running circumstances; and a reaction force correction apparatus that makes correction to reduce the reaction force currently generated by the reaction force generation apparatus in a case where it is predicted that the reaction force target value is increased by a change of the running circumstance detected by the running circumstance detection apparatus, and a difference between the reaction force target value corresponding to the running circumstance after the change and the reaction force currently generated by the reaction force generation apparatus is less than a predetermined difference.

The second aspect of the present invention provides a reaction force imparting method of a vehicle accelerator pedal, comprising: depending on two or more running circumstances of a vehicle, generating reaction force for an accelerator pedal in a returning direction thereof based on a predetermined reaction force target value, wherein the accelerator pedal is operated by tread force of a driver, and the reaction force target value is differentiated according to each of the running circumstances; and making correction to reduce the currently generated reaction force in a case where it is predicted that the reaction force target value is increased by a change of the running circumstance, and a difference between the reaction force target value corresponding to the running circumstance after the change and the currently generated reaction force is less than a predetermined difference.

BRIEF DESCRIPTION OF THE SEVERAL VIEWS OF THE DRAWING

FIG. 10 is a flowchart showing a processing procedure of a final reaction force calculation unit.

FIG. 11 is a flowchart showing a processing procedure of reduction correction processing of the final reaction force calculation unit.

DETAILED DESCRIPTION OF THE INVENTION

Hereinafter, description will be made of embodiments of the present invention with reference to the drawings.

[Configuration]

An accelerator pedal reaction force imparting system according to this embodiment controls reaction force for an accelerator pedal, which is operated by tread force of a driver, based on running circumstances of a vehicle. Here, the reaction force is generated in a returning direction of the accelerator pedal. In this embodiment, a distance between the vehicle and an object in front thereof and a lockup clutch engagement state of the vehicle are used as the running circumstances of the vehicle, and the reaction force for the accelerator pedal is controlled in response to the running circumstances.

Figure 1:
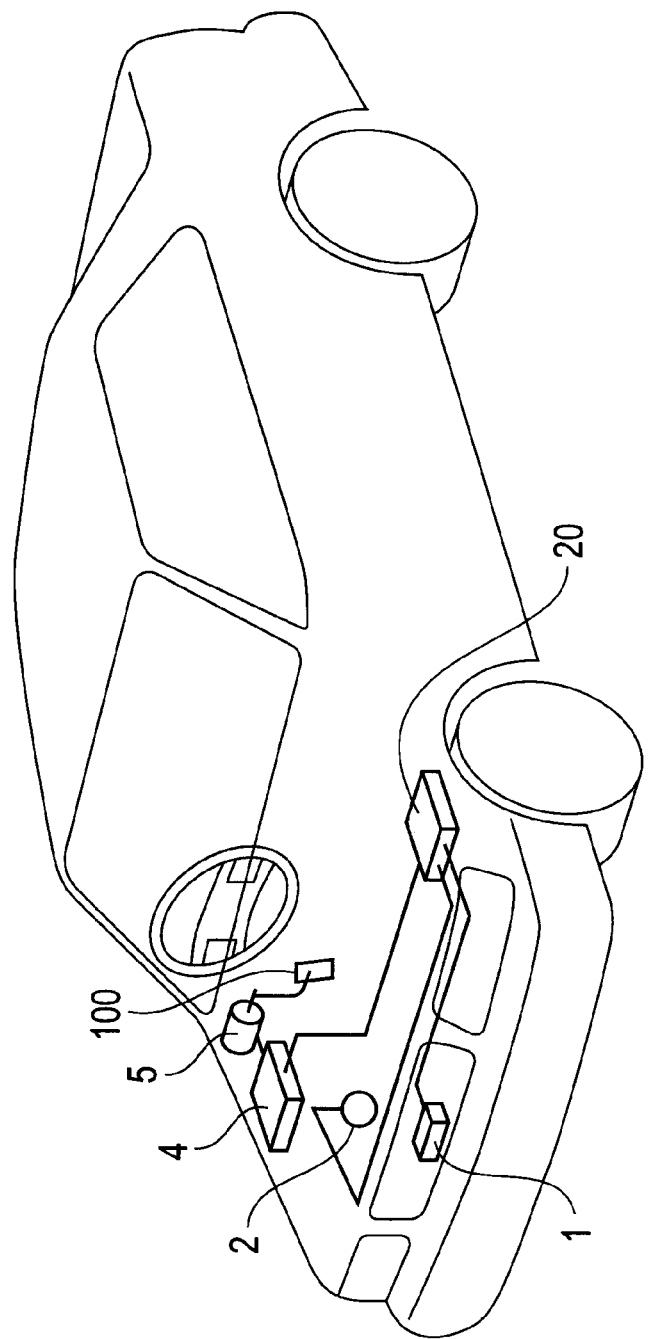
FIG. 1 is a schematic view showing a configuration of an accelerator pedal reaction force imparting system in a state of being mounted on a vehicle.
Figure 2:
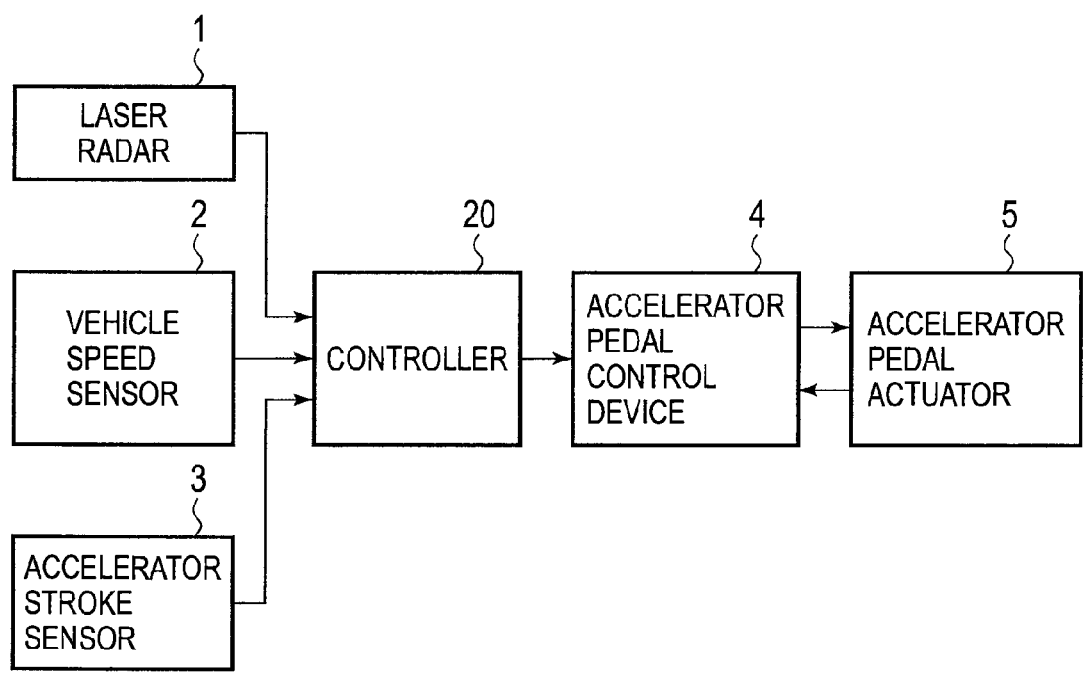
FIG. 2 is a block diagram showing a configuration of the accelerator pedal reaction force imparting system.

FIG. 1 and FIG. 2 show a configuration of the accelerator pedal reaction force imparting system. As shown in FIG. 1 and FIG. 2, the system includes: a laser radar 1; a vehicle speed sensor 2; an accelerator stroke sensor 3; a controller 20; an accelerator pedal control device 4; and an accelerator pedal actuator 5.

The laser radar 1 scans the front of the vehicle with infrared pulses in horizontal and vertical directions. Specifically, the laser radar 1 scans a predetermined area, which expands horizontally and vertically in front of the vehicle, with the infrared pulses. For example, the area scanned by the laser radar 1 is an area of a predetermined angle with respect to the front of the vehicle. The predetermined angle can be set, for example, at approximately ±10° horizontally and approximately from 0° to 3° vertically. The vehicle includes the laser radar 1 on a front grille, a front bumper or the like. The laser radar 1 measures each of reflected waves of the infrared pulses reflected on such a forward object. The forward object is, for example, a forward vehicle (preceding vehicle). The laser radar 1 measures a reflected wave of the infrared pulse reflected on a rear end of such a forward vehicle.

Then, the laser radar 1 detects such an intervehicular distance from the vehicle to the forward object and an existing direction of the forward object with respect to the vehicle based on an arrival time and emission direction of the reflected wave with respect to the emitted infrared pulse. The existing direction of the forward object is information indicated as a relative angle with respect to the vehicle. Moreover, when a plurality of the forward objects (preceding vehicles) exist, the laser radar 1 detects the intervehicular distances and existing directions of the plurality of forward objects. The laser radar 1 outputs the detected intervehicular distance and existing direction (depending on the case, the pluralities of intervehicular distances and existing directions) as forward object information to the controller 20.

Note that, though the description is made by taking as an example the laser radar in this embodiment, even an acoustic radar that emits sound waves and acquires the forward object information based on reflected waves of the emitted sound waves is also applicable.

The vehicle speed sensor 2 detects a speed of the vehicle. The vehicle speed sensor 2 detects such a vehicle speed, for example, based on a wheel speed sensor. For example, the vehicle speed sensor 2 detects the vehicle speed based on a wheel speed of a driven wheel or an average value of wheel speeds of front and rear wheels. The vehicle speed sensor 2 outputs the detected vehicle speed to the controller 20.

Figure 3:
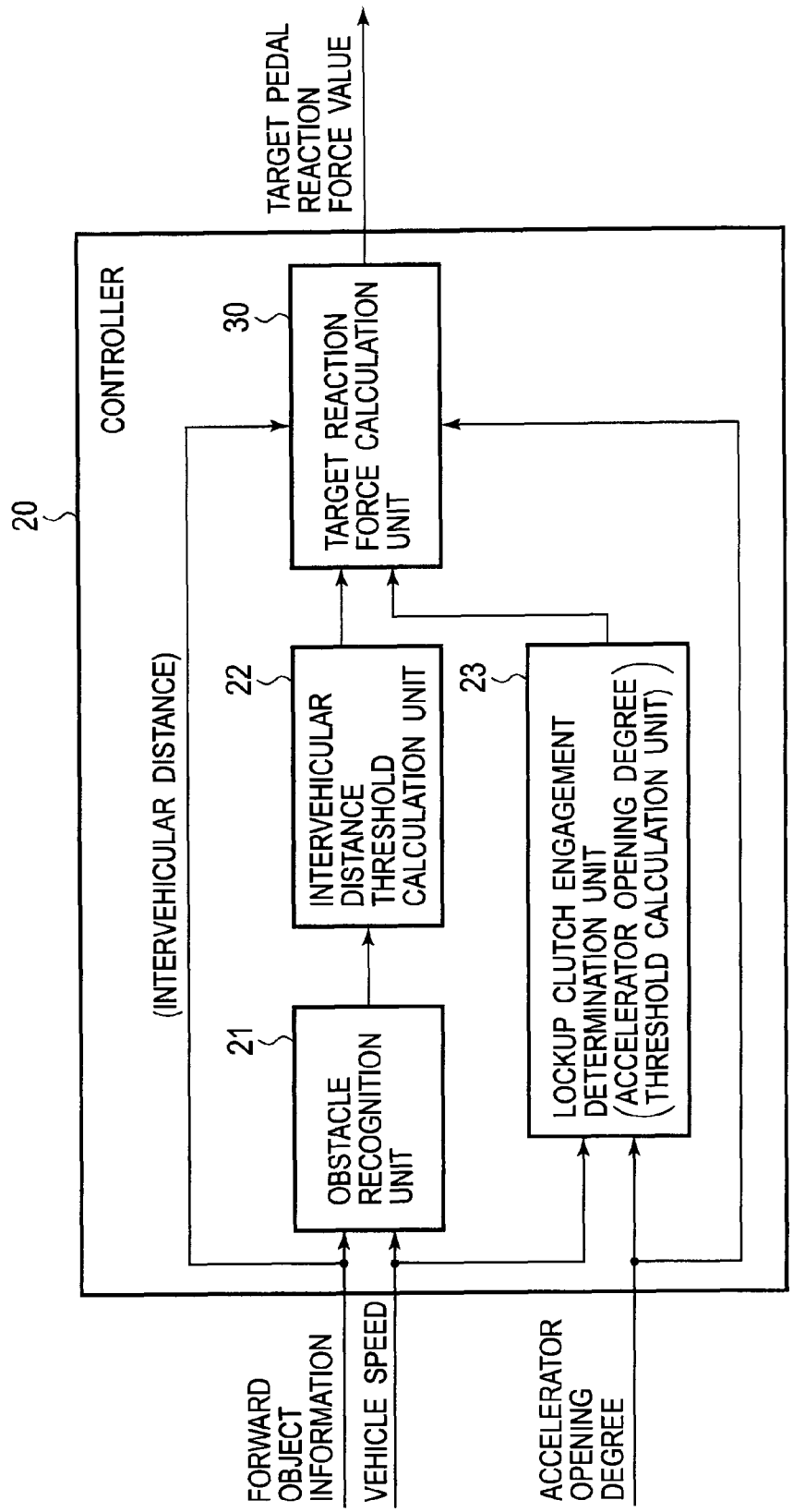
FIG. 3 is a block diagram showing a configuration of a controller.

The accelerator stroke sensor 3 detects an accelerator opening degree (accelerator pedal stroke), and outputs the detected accelerator opening degree to the controller 20. The controller 20 controls the entirety of the accelerator pedal reaction force imparting system. As shown in FIG. 3, the controller 20 includes: an obstacle recognition unit 21; an intervehicular distance threshold calculation unit 22; a lockup clutch engagement determination unit 23; and a target reaction force calculation unit 30. As shown in FIG. 3, the controller 20 receives the forward object information (intervehicular distance, existing direction and the like), the vehicle speed and the accelerator opening degree.

The obstacle recognition unit 21 detects an obstacle situation on the periphery of the vehicle (in particular, in front of the vehicle) based on the inputted forward object information and vehicle speed. The obstacle recognition unit 21 outputs the detected obstacle situation on the periphery of the vehicle to the intervehicular distance threshold calculation unit 22.

The intervehicular distance threshold calculation unit 22 calculates an intervehicular distance threshold based on the inputted obstacle situation on the periphery of the vehicle. Specifically, the intervehicular distance threshold calculation unit 22 calculates a first intervehicular distance threshold and a second intervehicular distance threshold. A calculation procedure of the first intervehicular distance threshold and the second intervehicular distance threshold will be described later in detail. The intervehicular distance threshold calculation unit 22 outputs the calculated intervehicular distance threshold (first intervehicular distance threshold and second intervehicular distance threshold) to the target reaction force calculation unit 30.

The lockup clutch engagement determination unit (accelerator opening degree threshold calculation unit) 23 determines an engagement state of a lockup clutch in an automatic transmission of the vehicle. The lockup clutch engagement determination unit 23 controls the reaction force based on the engagement state of the lockup clutch. Note that, as a technology for controlling the reaction force based on the engagement state of the lockup clutch, for example, there is a technology disclosed in Japanese Patent Unexamined Publication No. 2005-132225.

Figure 4:
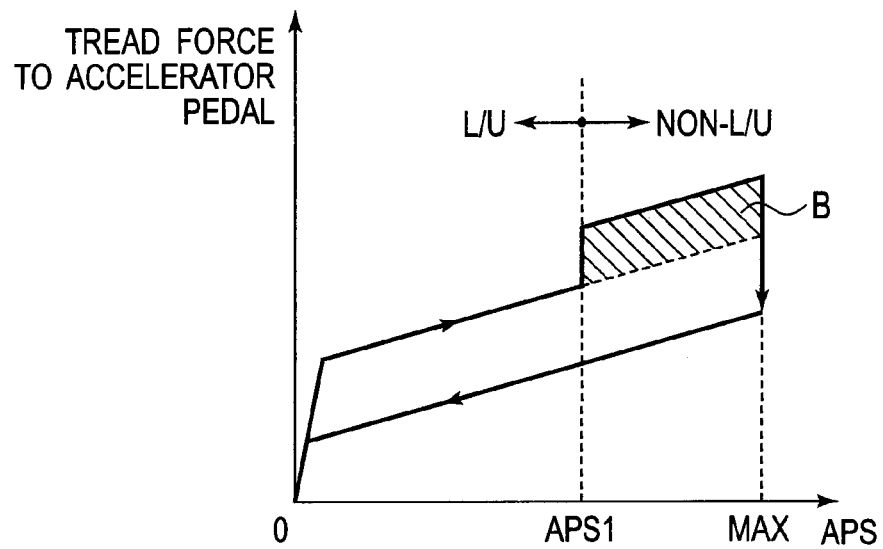
FIG. 4 is a relation diagram showing hysteresis characteristics between an accelerator pedal stroke and tread force to an accelerator pedal.
Figure 5:
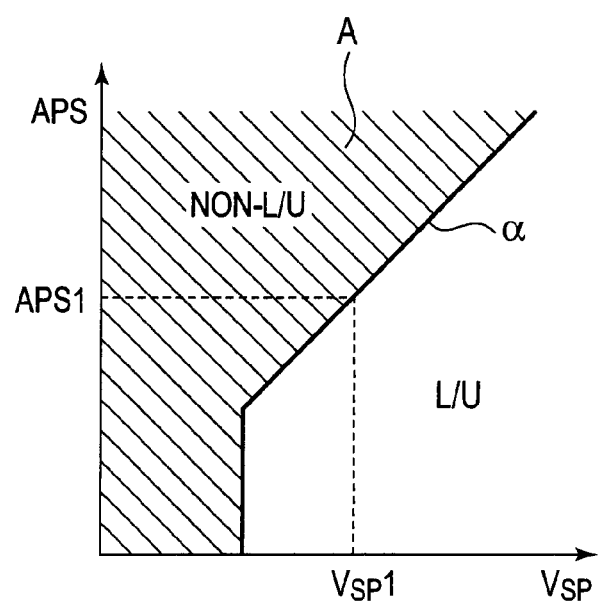
FIG. 5 is a relation diagram for deciding a threshold APS1 of an accelerator pedal stroke APS that increases depression-side tread force to the accelerator pedal, which is shown in FIG. 4.

FIG. 4 and FIG. 5 show relation diagrams when the reaction force is controlled based on the engagement state of the lockup clutch. FIG. 4 is a relation diagram showing hysteresis characteristics between an accelerator pedal stroke APS (accelerator opening degree) and the tread force to the accelerator pedal. FIG. 5 is a relation diagram for use in deciding a threshold APS1 of the accelerator pedal stroke APS that increases the tread force to the accelerator pedal, which is shown in FIG. 4. FIG. 5 is a relation diagram showing a lockup clutch release state (non-L/U) and a lockup clutch engagement state (L/U) in a relationship between the vehicle speed Vsp and the accelerator pedal stroke APS. Note that a region A on a left portion of a relationship line α in FIG. 5, which is shown by hatched lines, is a region of the release state of the lockup clutch.

In the reaction force control based on the engagement of the lockup clutch, it is determined whether the lockup clutch is in the lockup clutch release state (non-L/U) or the lockup clutch engagement state (L/U) from signals of the inputted vehicle speed Vsp and the accelerator pedal stroke APS based on this relation diagram of FIG. 5. Therefore, in the case where the lockup clutch is in the engagement state (L/U), the lockup clutch engagement determination unit 23 obtains, on the relationship line α of FIG. 5, the threshold (accelerator opening degree threshold) of the accelerator pedal stroke APS corresponding to the vehicle speed Vsp. For example, if the vehicle speed is a vehicle speed Vsp1, then, as illustrated, a value APS1 of the accelerator pedal stroke APS becomes a threshold for increasing the tread force to the accelerator pedal (that is, increasing the reaction force). The lockup clutch engagement determination unit 23 outputs the threshold APS1 of the accelerator pedal stroke APS, which is thus obtained, to the target reaction force calculation unit 30.

Figure 6:
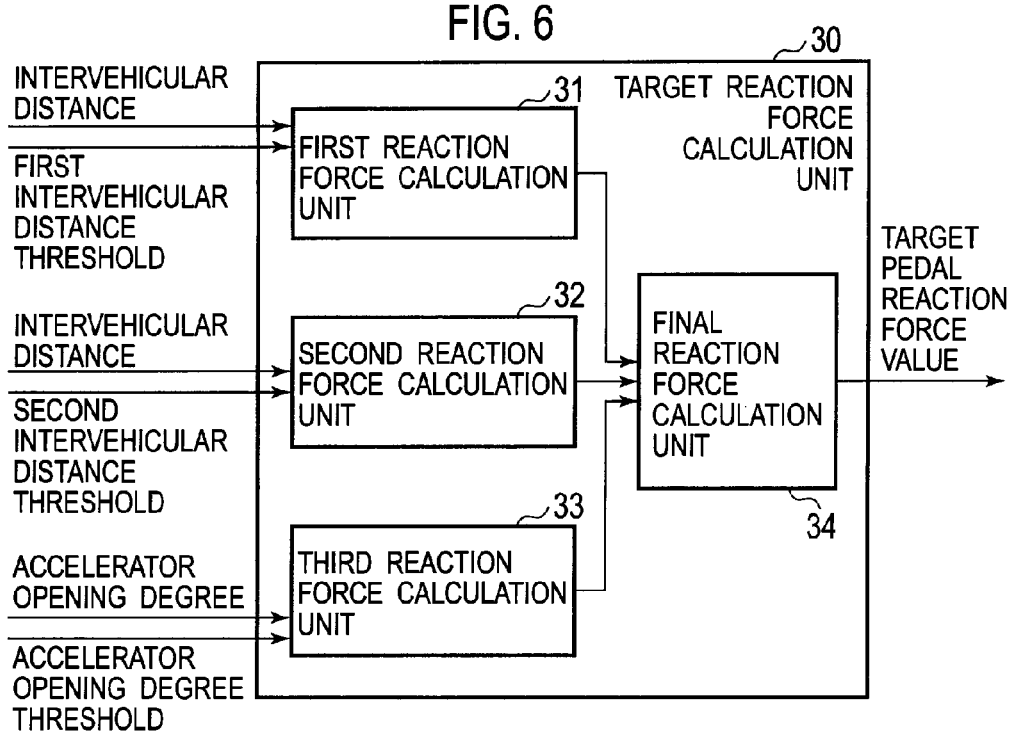
FIG. 6 is a block diagram showing a configuration of a target reaction force calculation unit.

The target reaction force calculation unit 30 calculates final target pedal additional reaction force (final reaction force command value). FIG. 6 shows a configuration of the target reaction force calculation unit 30. As shown in FIG. 6, the target reaction force calculation unit 30 includes: a first reaction force calculation unit 31; a second reaction force calculation unit 32; a third reaction force calculation unit 33; and a final reaction force calculation unit 34.

The first and second reaction force calculation units 31 and 32 calculate target pedal additional reaction forces based on the inputted intervehicular distance thresholds (first intervehicular distance threshold and second intervehicular distance threshold). The first and second reaction force calculation units 31 and 32 calculate, as the target pedal additional reaction forces, reaction force command values for controlling the reaction force to be imparted to the accelerator pedal. The target pedal additional reaction forces (reaction force command values) become control command values to drive the accelerator pedal control device 4 for generating a target reaction force value in the accelerator pedal.

Figure 7:
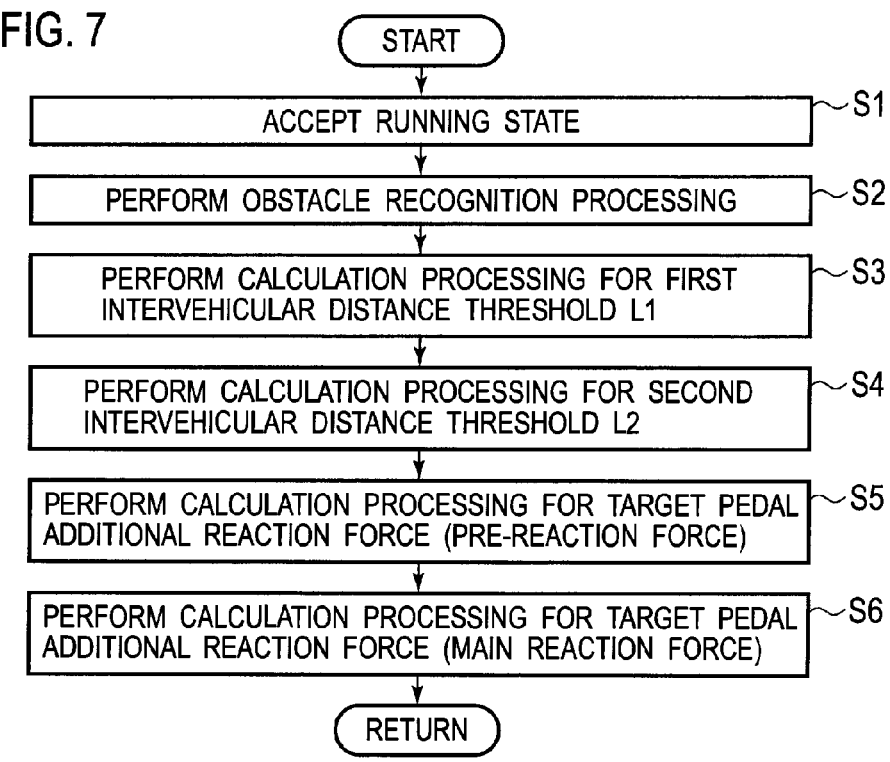
FIG. 7 is a flowchart showing a processing procedure of intervehicular distance maintenance assisting control of the controller.

FIG. 7 shows a procedure of control processing for maintaining the intervehicular distance in the controller 20. The controller 20 implements this processing at every fixed interval (for example, 10 msec). In combination with a description of the processing procedure in FIG. 7, processing of each of the above-mentioned constituents of the controller 20 will be described more in detail, and processing by the first and second reaction force calculation units 31 and 32 will be described.

As shown in FIG. 7, first in Step S1, the obstacle recognition unit 21 accepts the forward object information containing the intervehicular distance L, which is detected by the laser radar 1, and the vehicle speed detected by the vehicle speed sensor 2.

Subsequently in Step S2, the obstacle recognition unit 21 performs obstacle recognition processing. Specifically, the obstacle recognition unit 21 recognizes a situation of the forward object based on the forward object information and the vehicle speed, which are accepted in Step S1.

Here, the obstacle recognition unit 21 recognizes a relative position, moving direction or moving speed of the forward object with respect to the vehicle based on the forward object information and the vehicle speed, which are accepted in Step S1 before a previous processing cycle, and on the forward object information and the vehicle speed, which are accepted in Step S1 in a processing cycle at this time. Specifically, the obstacle recognition unit 21 compares the relative direction, moving speed or existing direction of the forward object with respect to the vehicle, which is accepted in Step S1 before the previous processing cycle, and is stored in a memory (not shown) and so on, and the relative direction, moving speed or existing direction of the forward object with respect to the vehicle, which is accepted in Step S1 in the processing cycle at this time, with each other. Then, based on a result of the comparison, the obstacle recognition unit 21 recognizes the relative position, moving speed or moving direction of the forward object detected at present.

Then, based on a result of the recognition, the obstacle recognition unit 21 recognizes at which position (relative position) the object exists in front of the vehicle, and at which speed (relative speed) the object moves (relatively moves) with respect to the vehicle.

Subsequently, in Step S3 and Step S4, the intervehicular distance threshold calculation unit 22 calculates the first intervehicular distance threshold and the second intervehicular distance threshold. To be more specific, the intervehicular distance threshold calculation unit 22 sets the first intervehicular distance threshold L1 and the second intervehicular distance threshold L2 based on the vehicle speed Vsp, the relative speed Vr and the vehicle speed Vp of the forward vehicle (forward object) by using the following Expression (1).

$$L1, L2 = f(Vsp, Vr, Vp) \quad (1)$$

Here, f is a function for calculating the first intervehicular distance threshold L1 and the second intervehicular distance threshold L2 based on variables Vsp, Vr and Vp. Note that the function f is a function that calculates the first intervehicular distance threshold L1 and the second intervehicular distance threshold L2, which are larger as the vehicle speed Vsp, the relative speed Vr and the vehicle speed Vp of the forward vehicle are larger. Here, a constant of the function f is differentiated in terms of value between the case of calculating the first intervehicular distance threshold L1 and the case of calculating the second intervehicular distance threshold L2. In such a way, the first intervehicular distance threshold L1 and the second intervehicular distance threshold L2 can be calculated separately from each other based on the function f. At this time, a condition is that the first intervehicular distance threshold L1 should be calculated to be smaller than the second intervehicular distance threshold L2 (L1<L2).

Note that, as the function f that calculates the first intervehicular distance threshold L1 and the second intervehicular distance threshold L2, for example, a function described in Japanese Patent Unexamined Publication No. 2007-269307 just needs to be applied. Specifically, the first intervehicular distance threshold L1 and the second intervehicular distance threshold L2 are calculated, for example, based on the following expressions.

Calculation expressions of the first intervehicular distance threshold L1

$$Lh1 = Vp \times Th1$$

$$Tr1 = (L - Lh1)/Vr$$

$$Lr1 = Tr1 \times Vr$$

$$L1 = Lh1 + Lr1$$

where Th1 is a preset intervehicular time.

Calculation expressions of the second intervehicular distance threshold L2

$$Lh2 = Vp \times Th2$$

$$Tr2 = (L - Lh2)/Vr$$

$$Lr2 = Tr2 \times Vr$$

$$L2 = Lh2 + Lr2$$

where Th2 is a preset intervehicular time larger than Th1.

Subsequently, in Step S5, the second reaction force calculation unit 32 calculates the target pedal additional reaction force (reaction force command value) based on the second intervehicular distance threshold L2 calculated in Step S4. To be more specific, the second reaction force calculation unit 32 calculates the target pedal additional reaction force τp when the intervehicular distance L becomes smaller than the second intervehicular distance threshold L2 (L<L2). Note that, in the following description, the reaction force added based on the second intervehicular distance threshold L2 will be referred to as pre-reaction force.

Figure 8:
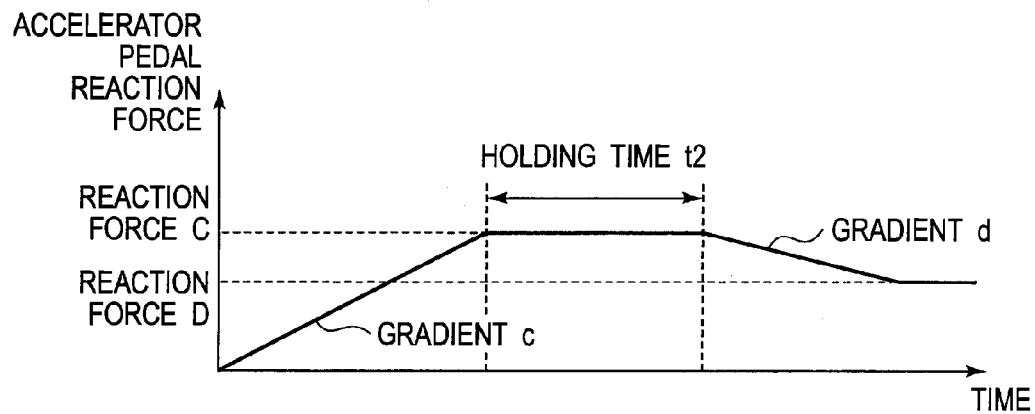
FIG. 8 is a characteristic chart showing characteristics of pre-reaction force.

FIG. 8 shows a specific calculation result (characteristics of the pre-reaction force) of the pre-reaction force (target pedal additional reaction force τp). When the intervehicular distance L becomes smaller than the second intervehicular distance threshold L2 (L<L2), then as shown in FIG. 8, the second reaction force calculation unit 32 starts an arithmetic operation of the pre-reaction force, and increases the pre-reaction force to reaction force C as predetermined reaction force with a predetermined gradient (increase rate) c. Then, the second reaction force calculation unit 32 holds the pre-reaction force at the reaction force C during a holding time t2. Thereafter, after the elapse of the holding time t2, the second reaction force calculation unit 32 reduces the pre-reaction force to reaction force D (smaller than the reaction force C) with a predetermined gradient (reduction rate) d (where |d|<|c|). Then, the second reaction force calculation unit 32 holds the reaction force D until the intervehicular distance L becomes equal to or larger than the second intervehicular distance threshold L2.

Note that, though the pre-reaction force is increased to the preset and predetermined reaction force C in the above-mentioned example, the pre-reaction force may be increased to a value increased in response to a state of the vehicle from the reaction force C that is set as the minimum value. In other words, the reaction force C may be added, for example, with a value corresponding to an operation state of the accelerator pedal while the pre-reaction force is being added thereto, and the pre-reaction force may be increased to the sum obtained by thus adding the value to the reaction force C. In the following, for the sake of simplifying the explanation, the reaction force C is defined as a preset and predetermined value (fixed value).

Here, the reaction forces C and D and the gradients c and d are, for example, such values at which the driver can easily perform an accelerator pedal operation in order to maintain the intervehicular distance, and such values at which the driver is made to recognize an occurrence of the pre-reaction force and is prompted to return the accelerator pedal. Moreover, these values are determined in advance by an experiment and the like. Furthermore, the holding time t2 is, for example, approximately 1 second.

The second reaction force calculation unit 32 outputs the calculated target pedal additional reaction force (reaction force command value) of the pre-reaction force to the final reaction force calculation unit 34.

Subsequently in Step S6, the first reaction force calculation unit 31 calculates the target pedal additional reaction force (reaction force command value) based on the first intervehicular distance threshold L1 calculated in Step S3. To be more specific, the first reaction force calculation unit 31 calculates the target pedal additional reaction force τm when the intervehicular distance L becomes smaller than the first intervehicular distance threshold L1 (L<L1). Note that, in the following description, the reaction force added based on the first intervehicular distance threshold L1 will be referred to as main reaction force in distinction from the pre-reaction force.

Figure 9:
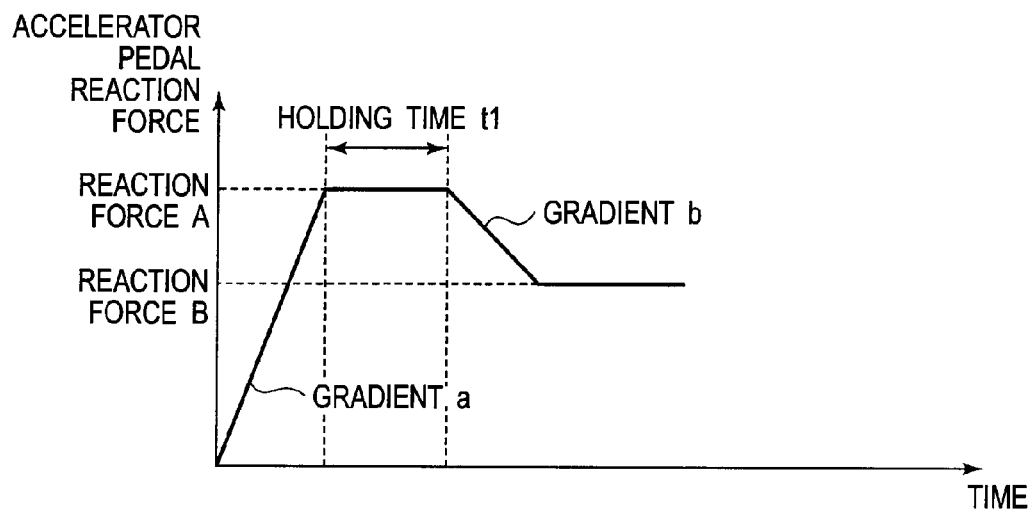
FIG. 9 is a characteristic chart showing characteristics of main reaction force.

FIG. 9 shows a specific calculation result of the main reaction force (target pedal additional reaction force τm, reaction force command value). When the intervehicular distance L becomes smaller than the first intervehicular distance threshold L1 (L<L1), then as shown in FIG. 9, the first reaction force calculation unit 31 starts an arithmetic operation of the main reaction force, and increases the main reaction force to reaction force A as predetermined reaction force larger than the reaction force C with a predetermined gradient (increase rate) a. Then, the first reaction force calculation unit 31 holds the main reaction force at the reaction force A during a holding time t1. Thereafter, after the elapse of the holding time t1, the first reaction force calculation unit 31 reduces the main reaction force to reaction force B (smaller than the reaction force A) with a gradient (reduction rate) b (where |b|<|a|). Then, the first reaction force calculation unit 31 holds the reaction force B until the intervehicular distance L becomes equal to or larger than the first intervehicular distance threshold L1.

Note that, though the main reaction force is increased to the preset and predetermined reaction force A in the above-mentioned example, the main reaction force may be increased to a value increased in response to the state of the vehicle from the reaction force A that is set as the minimum value. In other words, the reaction force A may be added, for example, with a value corresponding to the relative speed between the forward vehicle and the vehicle when the main reaction force is added thereto, and the main reaction force may be increased to the sum obtained by thus adding the value to the reaction force A. In the following, for the sake of simplifying the explanation, the reaction force A is defined as a preset and predetermined value (fixed value).

Here, the reaction force A has a value of such a magnitude that enables the driver to press back the accelerator pedal in the case where the driver operates the accelerator pedal with usual force, and that enables the driver to further depress (to increase a depression amount of) the accelerator pedal at the driver's will. Moreover, this value is determined in advance by an experiment and the like. Furthermore, the reaction force A is reaction force that assists a pedal change from the accelerator pedal to a brake pedal by the driver. Note that the usual force of the driver can be defined, for example, as tread force to the accelerator pedal when the vehicle runs at a constant speed.

Moreover, the gradient a has a value related, for example, to a speed of a change of the reaction force of the accelerator pedal when the driver makes the pedal change to the brake pedal (or to a speed of a change of the reaction force when the driver presses back the accelerator pedal). Note that this value is determined in advance by an experiment and the like. Moreover, the holding time t1 is, for example, approximately 0.5 second.

Moreover, the first reaction force calculation unit 31 calculates the reaction force B by using the following Expression (2).

$$\text{Reaction force } B = \text{Reaction force } A \times \Delta ACC \times K1 \qquad (2)$$

Here, K1 is a gain. A depression increment $\Delta ACC$ of the accelerator pedal is a depression increment of the accelerator pedal, which is calculated from the point of time when the intervehicular distance L becomes smaller than the first intervehicular distance threshold L1. This point of time is taken as a calculation starting point. Note that the second intervehicular distance threshold L2 can be used as the calculation starting time. In this Expression (2), the reaction force B becomes smaller as the depression increment $\Delta ACC$ of the accelerator pedal is increased. The reaction force B is calculated as described above, whereby the main reaction force (portion of the reaction force B) is made small when the driver further depresses the accelerator pedal at the driver's will.

The first reaction force calculation unit 31 outputs the calculated target pedal additional reaction force (reaction force command value) of the main reaction force to the final reaction force calculation unit 34.

Meanwhile, the third reaction force calculation unit 33 calculates target pedal additional reaction force (reaction force command value) based on a determination result (threshold APS1 of the accelerator pedal stroke APS) of the lockup clutch engagement determination unit 23. To be more specific, the third reaction force calculation unit 33 starts an arithmetic operation of the reaction force in the case where such a depression-side accelerator pedal stroke APS has reached the threshold APS1 obtained from the relation diagram of FIG. 5, and calculates target pedal additional reaction force τe so as to increase the reaction force to reaction force G as predetermined reaction force with a predetermined gradient (increase rate) e. The target pedal additional reaction force at this time has a value for actuating an actuator (accelerator pedal actuator 5) composing a tread force adding device, and increasing the depression-side tread force of the accelerator pedal. The third reaction force calculation unit 33 outputs the calculated target pedal additional reaction force (reaction force command value) to the final reaction force calculation unit 34.

Here, the reaction force G as the predetermined reaction force has a value smaller than the above-mentioned reaction force A and reaction force C. Specifically, in this embodiment, the magnitude of the reaction force is increased in order from the reaction force G that is based on the lockup clutch engagement state, the reaction force C of the pre-reaction force, and the reaction force A of the main reaction force (reaction force G<reaction force C<reaction force A). In the following description, the reaction force G, the reaction force A and the reaction force C are generically referred to as reaction force target values. Here, the reaction force G, the reaction force A and the reaction force C are those corresponding to the running circumstances (lockup clutch engagement state, intervehicular distance L with respect to the first intervehicular distance threshold L1, intervehicular distance L with respect to the second intervehicular distance threshold L2).

Note that, in the case where the accelerator pedal stroke APS has exceeded the threshold APS1, the engagement of the lockup clutch of the automatic transmission is released, and fuel efficiency is decreased. Therefore, in the impartation of the reaction force, which is based on this lockup clutch engagement state, the reaction force G is added to the accelerator pedal when the accelerator pedal stroke APS has reached the threshold APS1, and the driver is notified that the engagement of the lockup clutch is released. Moreover, in the impartation of the reaction force G, the accelerator pedal stroke APS is suppressed from increasing beyond the threshold APS1, and a drive by the driver under good fuel efficiency is assisted.

The final reaction force calculation unit 34 performs select-high control for the inputted target pedal additional reaction forces τp, τm and τe (reaction force command values). In other words, the final reaction force calculation unit 34 selects a higher one from the reaction force command values, and then obtains the final target pedal additional reaction force (final reaction force command value). FIG. 10 shows a specific processing procedure of the final reaction force calculation unit 34.

As shown in FIG. 10, first in Step S11, the final reaction force calculation unit 34 predicts transition of the reaction force by transition of the running circumstances. For example, in the case where the reaction force that is based on the lockup clutch engagement state is imparted at present, the final reaction force calculation unit 34 predicts whether the impartation of the reaction force shifts to the impartation of the pre-reaction force as the reaction force that is based on the second intervehicular distance threshold L2 or shifts to the impartation of the main reaction force as the reaction force that is based on the first intervehicular distance threshold L1.

In other words, the final reaction force calculation unit 34 predicts whether or not the running circumstances in which the reaction force is to be imparted make transition. In the case of having predicted that the reaction force shifts, the final reaction force calculation unit 34 proceeds to Step S12, and otherwise, proceed to Step S14.

For example, the final reaction force calculation unit 34 predicts the transition to the pre-reaction force when the intervehicular distance L tends to be decreased and becomes smaller than a second threshold as a distance (L2+α) larger than the second intervehicular distance threshold L2 by a predetermined distance α. Moreover, the final reaction force calculation unit 34 predicts the transition to the main reaction force when the intervehicular distance L tends to be decreased and becomes smaller than a first threshold as a distance (L1+β) larger than the first intervehicular distance threshold L1 by a predetermined distance β. Note that the first threshold (L1+β) is a value smaller than the second intervehicular distance threshold L2. Moreover, the predetermined distances α and β are predetermined experimental values, experiential values or theoretical values.

Alternatively, the final reaction force calculation unit 34 may predict the transition of the reaction force based on a time-to-collision (TTC) as a value obtained by dividing the intervehicular distance by the relative speed (intervehicular distance/relative speed). For example, in the case where the time-to-collision TTC becomes smaller than a predetermined threshold, the final reaction force calculation unit 34 may predict that the target pedal additional reaction forces τp and τm are generated, in other words, may predict that the impartation control of the reaction force shifts to reaction force control that is based on the target pedal additional reaction force τp and τm. In this case, by setting a plurality of the predetermined thresholds correspondingly to the respective target pedal additional reaction forces τp and τm, the final reaction force calculation unit 34 individually predicts the transition to the pre-reaction force (target pedal additional reaction force τp) and the transition to the main reaction force (target pedal additional reaction force τm). Here, the predetermined thresholds are experimental values, experiential values or theoretical values.

In this embodiment, when the intervehicular distance L tends to be decreased, and becomes less than the second threshold larger than the second intervehicular distance threshold L2 by the predetermined distance α (that is, L<L2+α), the transition to the pre-reaction force is predicted. Moreover, when the intervehicular distance L tends to be decreased, and becomes less than the first threshold larger than the first intervehicular distance threshold L1 by the predetermined distance β (that is, L<L1+β), the transition to the main reaction force is predicted.

In Step S12, the final reaction force calculation unit 34 determines whether or not the reaction force target value after the predicted transition is larger than a current reaction force target value. To be more specific, the final reaction force calculation unit 34 determines that the reaction force after the transition is larger when it is predicted that such output transition is made to output of the pre-reaction force (reaction force in which the reaction force target value is the reaction force C) or to output of the main reaction force (reaction force in which the reaction force target value is the reaction force A) in the case where the reaction force (reaction force in which the reaction force target value is the reaction force G) that is based on the target pedal additional reaction force to is currently outputted. Alternatively, the final reaction force calculation unit 34 determines that the reaction force after the transition is larger when it is predicted that the output transition is made to the output of the main reaction force in the case where the pre-reaction force is currently outputted. In the case where the reaction force target value after the predicted transition is larger, the final reaction force calculation unit 34 proceeds to Step S13, and otherwise, proceeds to Step S14.

In Step S13, the final reaction force calculation unit 34 makes correction to reduce the current reaction force (reaction force imparted actually to the accelerator pedal). To be more specific, the final reaction force calculation unit 34 corrects the current reaction force so that a difference between the current reaction force and the reaction force target value (reaction force A or reaction force C) after the predicted transition can become a predetermined difference or more.

FIG. 11 shows a processing procedure of such reaction force correction. As shown in FIG. 11, first in Step S21, the final reaction force calculation unit 34 determines whether or not the reaction force shifts to the pre-reaction force. In the case where the reaction force shifts to the pre-reaction force, the final reaction force calculation unit 34 proceeds to Step S22. Specifically, in the case of predicting that the transition is made from the reaction force corresponding to the lockup clutch engagement state, which is the current reaction force, to the pre-reaction force, the final reaction force calculation unit 34 proceeds to Step S22. Otherwise, that is, in the case where the transition is made to the main reaction force, the final reaction force calculation unit 34 proceeds to Step S23. Specifically, in the case of predicting that the transition is made to the main reaction force from the reaction force corresponding to the lockup clutch engagement state, which is the current reaction force, or from the pre-reaction force, the final reaction force calculation unit 34 proceeds to Step S23.

In Step S22, the final reaction force calculation unit 34 corrects the current reaction force by a first correction amount. The first correction amount is an experimental value, an experiential value or a theoretical value, and is such a predetermined value that enables the driver to surely recognize the change of the reaction force in the case where a reaction force change equal to or more than this first correction amount occurs. To be more specific, the final reaction force calculation unit 34 corrects the current reaction force (reaction force corresponding to the lockup clutch engagement state) so that a difference between the current reaction force and the reaction force C as the reaction force target value of the pre-reaction force can become the first correction amount or more.

Specifically, the final reaction force calculation unit 34 calculates a difference between the reaction force C and the current reaction force. Then, if the calculated difference is less than the first correction amount, then the final reaction force calculation unit 34 makes correction to reduce the current reaction force so that the difference between the reaction force C and the current reaction force can become equal to or more than the first correction amount. Meanwhile, if the difference is equal to or more than the first correction amount, then the final reaction force calculation unit 34 does not make the correction to reduce the current reaction force. Then, the final reaction force calculation unit 34 ends the processing shown in FIG. 11, and proceeds to Step S14 of FIG. 10.

In Step S23, the final reaction force calculation unit 34 corrects the current reaction force by a second correction amount. The second correction amount is a predetermined experimental value, experiential value or theoretical value. The second correction amount has a value larger than the first correction amount. To be more specific, the final reaction force calculation unit 34 corrects the current reaction force (reaction force corresponding to the lockup clutch engagement state or the pre-reaction force) so that a difference between the current reaction force and the reaction force A as the reaction force target value of the main reaction force can become the second correction amount or more.

Specifically, the final reaction force calculation unit 34 calculates a difference between the reaction force A and the current reaction force. Then, if the calculated difference is less than the second correction amount, then the final reaction force calculation unit 34 makes correction to reduce the current reaction force so that the difference between the reaction force A and the current reaction force can become equal to or more than the second correction amount. Meanwhile, if the difference is equal to or more than the second correction amount, then the final reaction force calculation unit 34 does not make the correction to reduce the current reaction force. Then, the final reaction force calculation unit 34 ends the processing shown in FIG. 11, and proceeds to Step S14 of FIG. 10.

In Step S14, the final reaction force calculation unit 34 outputs the final target pedal additional reaction force (final reaction force command value). To be more specific, the final reaction force calculation unit 34 selects a higher one of the current reaction force and the other reaction force (target pedal additional reaction force). Here, when the final reaction force calculation unit 34 has proceeded to Step S14 after obtaining the determination results "Yes" in Step S11 and Step S12, the other reaction force usually becomes an actual value of the reaction force predicted to shift. Moreover, in the case where the current reaction force mentioned herein is subjected to the reduction correction by the first correction amount or the second correction amount in Step S22 or Step S23, the current reaction force becomes a value after being subjected to the reduction correction.

Then, the target reaction force calculation unit 30 defines the target pedal additional reaction force selected to be higher as the final target pedal additional reaction force τ (final reaction force command value). Specifically, for example, in the case where it is determined in Step S12 that the reaction force after the transition is smaller, in usual, the current reaction force is maintained and becomes the final target pedal additional reaction force τ (final reaction force command value).

Based on the final target pedal additional reaction force τ outputted from the controller 20 (target reaction force calculation unit 30), the accelerator pedal control device 4 controls, by a drive signal, torque (external force to be imparted to the accelerator pedal) generated by the accelerator pedal actuator 5.

Figure 12:
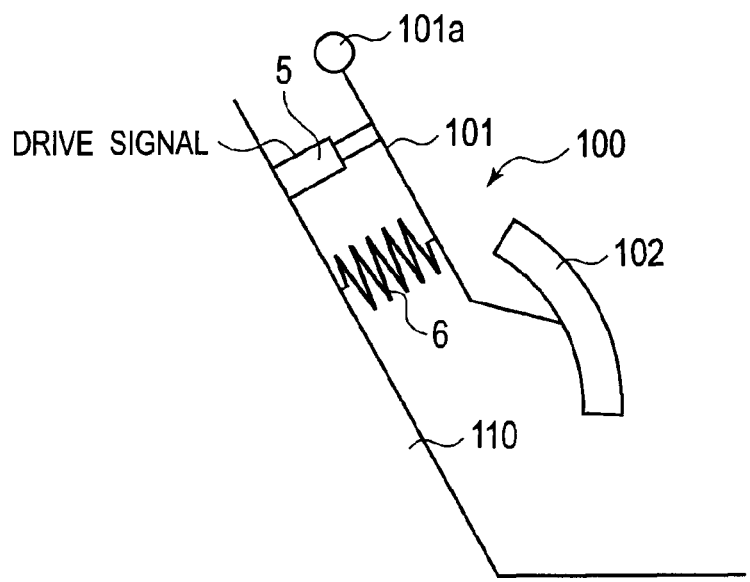
FIG. 12 is a view showing a configuration example of an accelerator pedal actuator.

FIG. 12 shows a configuration example of the accelerator pedal actuator 5. An accelerator pedal 100 is an accelerator pedal of a suspended type (type including a rotation shaft of a pedal in an upper portion of the accelerator pedal). This accelerator pedal 100 includes: an arm 101 in which one end (support portion 101a) is supported on a vehicle body so as to be freely rotatable; and a pedal (pad) 102 attached to the other end of the arm 101.

The accelerator pedal actuator 5 is in a state of being arranged between the arm 101 of the accelerator pedal 100 and a vehicle body floor 110. The accelerator pedal actuator 5 extends and retracts by being driven by a motor. The accelerator pedal actuator 5 operates so as to push out the arm 101 to the driver's side with force corresponding to the target pedal additional reaction force (reaction force command value), and to impart reaction force equivalent to the target pedal additional reaction force to the accelerator pedal 100.

By such drive of the accelerator pedal actuator 5, the accelerator pedal control device 4 generates the reaction force on the accelerator pedal 100, and controls the tread force of the driver to the accelerator pedal 100. Moreover, as shown in FIG. 12, as a component that generally generates reaction force, an elastic body 6 is arranged between the arm 101 of the accelerator pedal 100 and the vehicle body floor 110. For example, a spring is mentioned as the elastic body 6. In such a way, the reaction force to be imparted to the accelerator pedal 100 becomes reaction force obtained by adding the reaction force of the accelerator pedal actuator to the reaction force (usual reaction force) of the elastic body 6.

[Operation and Function]

(Reaction Force Control Based on Intervehicular Distance)

The accelerator pedal reaction force imparting system according to this embodiment accepts running circumstance data during the vehicle running, and recognizes the situation of the forward object (Step S1 and Step S2).

Subsequently, based on the recognized situation of the forward object, the accelerator pedal reaction force imparting system calculates the target pedal additional reaction force $\tau$. Specifically, first, based on the vehicle speed Vsp, the relative speed Vr and the vehicle speed Vp of the forward vehicle, the system calculates the first intervehicular distance threshold and the second intervehicular distance threshold (Step S3 and Step S4). Moreover, the system calculates the target pedal additional reaction force $\tau p$ (reaction force command value) of the pre-reaction force based on the calculated second intervehicular distance threshold, and further, calculates the target pedal additional reaction force $\tau m$ (reaction force command value) of the main reaction force based on the calculated first intervehicular distance threshold (Step S5 and Step S6).

(Relationship Between Pre-Reaction Force and Main Reaction Force)

Figure 13:
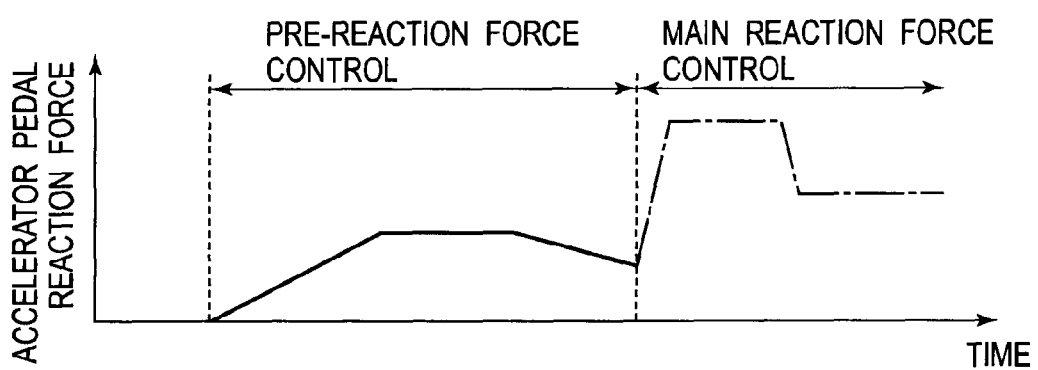
FIG. 13 is a chart showing an example of a change of the accelerator pedal reaction force (pre-reaction force or main reaction force).

FIG. 13 is an example where the change of the accelerator pedal reaction force to be imparted by the accelerator pedal reaction force imparting system is shown by a change with time. For example, the change thus shown is a change of the accelerator pedal reaction force obtained when the intervehicular distance L becomes smaller with elapse of time. The accelerator pedal reaction force is either the pre-reaction force or the main reaction force. Here, the accelerator pedal reaction force shown in FIG. 13 only shows the accelerator pedal reaction force to be imparted by the system, and the usual reaction force is not taken into consideration. Note that, in a similar way, the usual reaction force is not taken into consideration also in the accelerator pedal reaction forces shown in FIG. 8, FIG. 9 and FIG. 14. Moreover, this example in FIG. 13 shows a change of the accelerator pedal, in which the reaction force correction performed when it is predicted that the reaction force shifts (running circumstances shift) is not taken into consideration. Specifically, the value which the final reaction force calculation unit 34 obtains by performing the select-high control for the target pedal additional reaction force $\tau p$ of the pre-reaction force and the target pedal additional reaction force $\tau m$ of the main reaction force is defined as the final target pedal additional reaction force $\tau$. Furthermore, this example shows the case where the accelerator pedal control device 4 controls the drive of the accelerator pedal actuator 5 based on the final target pedal additional reaction force $\tau$.

As shown in FIG. 13, first, the accelerator pedal reaction force imparting system implements pre-reaction force control for generating the pre-reaction force as the accelerator pedal reaction force in a section in which the intervehicular distance L becomes smaller than the second intervehicular distance threshold L2. The pre-reaction force at this time is changed with time as shown in FIG. 8.

As a scene where the pre-reaction force is generated as the accelerator pedal reaction force, there is a scene where the vehicle approaches the forward vehicle, and an approaching degree thereof becomes such that the driver must maintain the intervehicular distance by an operation of the accelerator pedal. Moreover, there is a scene where the value of the intervehicular distance suddenly falls down below the second intervehicular distance threshold L2 in the case where another vehicle breaks in front of the vehicle, the case where the intervehicular distance control device switches from another one (ACC, adaptive cruise control) to this control device 4, or the like. In such a case, the accelerator pedal reaction force imparting system generates, as the accelerator pedal reaction force, the pre-reaction force enough to be recognizable by the driver.

Then, when the intervehicular distance L becomes smaller than the first intervehicular distance threshold L1, the accelerator pedal reaction force imparting system starts the arithmetic operation of the main reaction force. In such a way, when the main reaction force obtained by the arithmetic operation becomes larger than the pre-reaction force, the accelerator pedal reaction force imparting system implements the main reaction force control for generating the main reaction force as the accelerator pedal reaction force. The main reaction force (accelerator pedal reaction force) at this time is changed with time as shown in FIG. 9.

As a scene where the main reaction force is generated as the accelerator pedal reaction force, there is a scene where the vehicle further approaches the forward vehicle, and the approaching degree thereof becomes such that the driver requires an operation of the brake pedal. Moreover, there is a scene where another vehicle breaks in front of the vehicle. In such a case, the accelerator pedal reaction force imparting system generates, as the accelerator pedal reaction force, the main reaction force that assists the pedal change operation of the driver from the accelerator pedal to the brake pedal.

(Reaction Force Control Based on Lockup Clutch Engagement State)

In the case where the lockup clutch is in the engagement state (L/U), the accelerator pedal reaction force imparting system obtains the threshold APS1 of the accelerator pedal stroke APS, which corresponds to the vehicle speed Vsp1, on the relation diagram a of FIG. 5 based on signals of the vehicle speed Vsp and the accelerator pedal stroke APS, which are inputted during the vehicle running.

Then, in the case where the depression-side accelerator pedal stroke APS has reached the threshold APS1 obtained from the relation diagram of FIG. 5, the accelerator pedal reaction force imparting system actuates the accelerator pedal actuator 5, and increases the depression-side tread force to the accelerator pedal.

In such a way, when the value of the accelerator pedal stroke APS reaches the threshold APS1 from the region of the lockup clutch engagement state (L/U), the depression-side tread force to the accelerator pedal 2 is increased. As a result, the depression-side tread force to the accelerator pedal in the region of the lockup clutch release state (non-L/U) is increased. Therefore, as shown in FIG. 4, in a portion where the accelerator pedal stroke APS exceeds the threshold APS1, the tread force can be increased by the amount of a tread force increasing region B shown by hatched lines.

As described above, the accelerator pedal reaction force imparting system changes the reaction force of the accelerator pedal even in switching of vehicle driving characteristics, such as the engagement/release of the lockup clutch. Therefore, information on the switching of the vehicle driving characteristics can be accurately transmitted to the driver.

(Reaction Force Control when it is Predicted that Reaction Force Shifts)

If the reaction force target value after the transition, which is obtained as a result that the reaction force (running circumstances in which the reaction force is to be imparted) is predicted to shift, is larger than the current reaction force target value, and the difference between the current reaction force and the reaction force target value after the transition is less than a predetermined difference, then the accelerator pedal reaction force imparting system makes the correction to reduce the current reaction force (Step S11 to Step S13).

Then, the accelerator pedal reaction force imparting system defines, as the final target pedal additional reaction force τ (final reaction force command value), the value obtained by performing the select-high control for the current reaction force and another reaction force (for example, actual value of the reaction force predicted to shift). In such a way, in the system, when the actual value of the reaction force predicted to shift has exceeded the corrected current reaction force, the actual value of the reaction force predicted to shift is outputted as the final target pedal additional reaction force to the accelerator pedal control device 4 (Step S14).

In this embodiment, in the case where the current reaction force is the reaction force that is based on the lockup clutch engagement state, the reaction force predicted to shift becomes the reaction force (pre-reaction force or main reaction force) that is based on the intervehicular distance. Moreover, in the case where the current reaction force is the pre-reaction force that is based on the intervehicular distance, the reaction force predicted to shift becomes the main reaction force that is based on the intervehicular distance.

Figure 14:
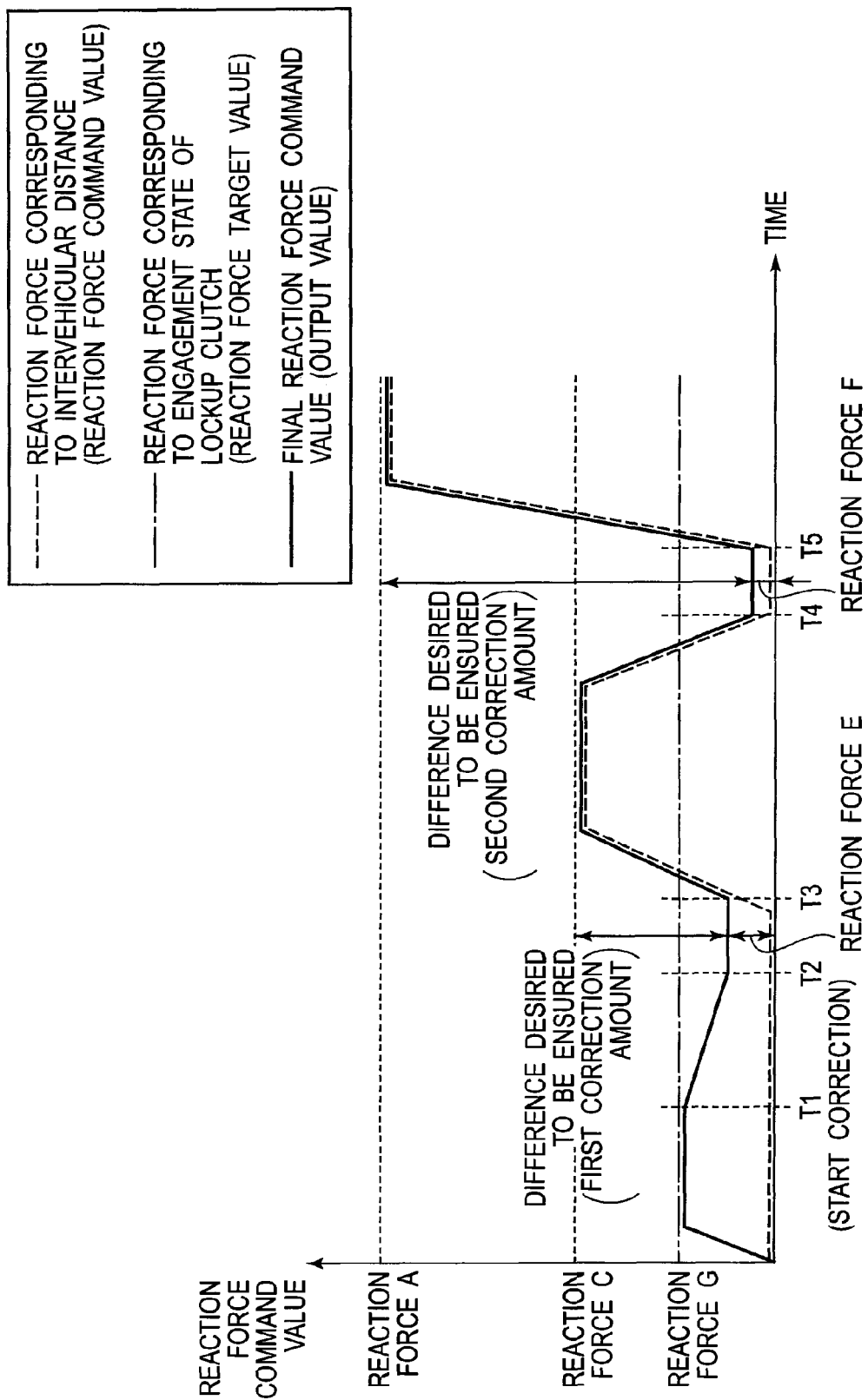
FIG. 14 is a chart showing a change of the reaction force subjected to the reduction correction.

FIG. 14 shows a change of the accelerator pedal reaction force. FIG. 14 shows the change of the reaction force when the transition is made from the reaction force control that is based on the lockup clutch engagement state to the reaction force control that is based on the intervehicular distance. In the reaction force control that is based on the intervehicular distance, further, the transition is made from the reaction force control (pre-reaction force control) for making the pre-reaction force to the reaction force control (main force control) for making the main reaction force.

As shown in FIG. 14, when the intervehicular distance tends to be decreased and becomes smaller than the second threshold (L2+α) (time T1) during the reaction force control that is based on the lockup clutch engagement state, the accelerator pedal reaction force imparting system corrects the target pedal additional reaction force τe (current reaction force) for use in the reaction force control. At this time, the system makes the correction to reduce the target pedal additional reaction force τe (current reaction force) in order to ensure the predetermined difference (first correction amount) with respect to the reaction force C (reaction force target value) that becomes maximum at the target pedal additional reaction force τp of the pre-reaction force. At this time, the system can also gradually reduce the target pedal additional reaction force τe to desired reaction force (reaction force E) at a predetermined reduction rate.

Then, at a point of time T2 when the difference between the target pedal additional reaction force τe and the reaction force C becomes equal to or more than the first correction amount, that is, at a point of time when the target pedal additional reaction force τe corrected to be reduced becomes the reaction force E smaller than the reaction force C by the first correction amount or more, the system ends the correction to reduce the target pedal additional reaction force τe, and maintains the reaction force E. In the system, thereafter, at timing when the intervehicular distance is further decreased and becomes smaller than the second intervehicular distance threshold L2, the calculation of the target pedal additional reaction force τp for the pre-reaction force control is started. Thereafter, when the target pedal additional reaction force τp for the pre-reaction force control becomes larger than the target pedal additional reaction force τe (reaction force E) (time T3), the reaction force E shifts to the target pedal additional reaction force τp for the pre-reaction force control by the select-high control.

Moreover, as shown in FIG. 14, when the intervehicular distance tends to be decreased and becomes smaller than the first threshold (L1+β) during the pre-reaction force control, the system makes the correction to reduce the target pedal additional reaction force τp (current reaction force) for use in the pre-reaction force control.

At this time, the system makes the correction to reduce the target pedal additional reaction force τp (current reaction force) for use in the pre-reaction force control in order to ensure the predetermined difference (second correction amount) with respect to the reaction force A that becomes the reaction force target value of the main reaction force. Here, the system can also gradually reduce the target pedal additional reaction force τp to desired reaction force (reaction force F) at a predetermined reduction rate.

Then, in the system, at timing when the intervehicular distance is further decreased and becomes smaller than the first intervehicular distance threshold L1, the calculation of the target pedal additional reaction force τm for the main reaction force control is started. Thereafter, when the target pedal additional reaction force τm for the main reaction force control becomes larger than the target pedal additional reaction force τp (reaction force F) (time T5), the reaction force F shifts to the target pedal additional reaction force τm for the main reaction force control by the select-high control.

Modification Examples (1) In the above embodiment, the intervehicular distance between the vehicle and the forward object and the lockup clutch engagement state of the vehicle are used as the running circumstances, and the reaction force control is performed based on the intervehicular distance and the lockup clutch engagement state. As opposed to this, the reaction force control can also be performed based on other running circumstances than the above. For example, the reaction force control can also be performed based on running circumstances such as the vehicle speed and running resistance when the vehicle corners. To be more specific, for example, apparatuses for performing the accelerator pedal reaction force control, which will be described below, are conceived. The apparatuses are: an apparatus that increases the accelerator pedal reaction force in the case where the vehicle speed has exceeded a vehicle speed set by the driver, and assists the accelerator pedal operation of the driver; an apparatus that reduces the accelerator pedal reaction force as the running resistance is larger, and assists the accelerator pedal operation of the driver; and the like.

(2) In the above embodiment, at the time when the running circumstances in which the reaction force is to be imparted make the transition, the current reaction force is corrected so that the variation of the reaction force can become the predetermined differences (first correction amount, second correction amount) or more. As opposed to this, the correction to reduce the current reaction force can also be made based only on conditions where, after predicting that the running circumstances make the transition, the reaction force target value after the transition is larger than the current reaction force target value, and the difference between the reaction force target value after the transition and the current reaction force is less than the predetermined difference. Specifically, the correction to reduce the current reaction force can also be made in the case where that the predetermined differences (first correction amount, second correction amount) should be ensured is not defined as requirements, and after predicting that the running circumstances make the transition, the reaction force target value after the transition is larger than the current reaction force target value, and the difference between the reaction force target value after the transition and the current reaction force is less than the predetermined difference. In this case, it is possible that the variation of the reaction force at the time when the running circumstances make the transition cannot be set at the predetermined differences (first correction amount, second correction amount) or more. However, at least the variation of the reaction force at the time when the running circumstances make the transition can be increased more than in the case where the reduction correction is not made, and it becomes easy for the driver to recognize the change of the reaction force.

(3) The correction to reduce the current reaction force can also be made in consideration of priority to implement the reaction force control. As the priority, a risk degree can be mentioned. Specifically, the priority is increased as the risk degree is higher.

In such a way, if, after predicting that the running circumstances make the transition, the reaction force target value after the transition is larger than the current reaction force target value, and the priority to generate the reaction force based on the running circumstances predicted to make the transition is higher, then the correction to reduce the current reaction force is made. Specifically, in the case where the reaction force to be imparted after the transition of the running circumstances is reaction force that is based on a risk higher than in the current running circumstances, the correction to reduce the current reaction force is made.

Hence, even if, after predicting that the running circumstances make the transition, the reaction force target value that is based on the running circumstances predicted to make the transition is larger than the reaction force target value that is based on the current running circumstances, if the priority to generate the reaction force based on the running circumstances predicted to make the transition is low, then the correction to reduce the current reaction force is not made.

Specifically, in the above embodiment, the reaction force C as the reaction force target value of the pre-reaction force is larger than the reaction force G as the reaction force target value that is based on the engagement state of the lockup clutch. However, for example, a case is considered, where the reaction force G is larger than the reaction force C on the contrary. In this case, the pre-reaction force is the reaction force to be imparted based on the intervehicular distance, and is the reaction force that is based on the higher risk than in the reaction force that is based on the engagement state of the lockup clutch. Therefore, in the case where the transition is made from the pre-reaction force to the reaction force that is based on the engagement state of the lockup clutch, the correction to reduce the current reaction force is not made even if the reaction force G is larger than the reaction force C.

(4) In response to the priority, the correction amounts (predetermined differences) such as the first correction amount and the second correction amount can be set. For example, the correction amounts are increased as the priority is higher. As a result, the reaction forces (reaction force E, reaction force F) corrected to be reduced become smaller as the priority is higher.

(5) In FIG. 14, the reaction forces (reaction force E, reaction force F) corrected to be reduced take predetermined values. As opposed to this, the reaction forces (reaction force E, reaction force F) corrected to be reduced can be set at zero if the predetermined differences (first correction amount, second correction amount) can be ensured.

(6) In the above embodiment, the transition of the reaction force (running circumstances in which the reaction force is to be imparted) is predicted based on the intervehicular distance. As opposed to this, the transition of the reaction force can also be predicted by other methods. For example, the transition of the reaction force can also be predicted based on a calculation state of the target pedal additional reaction force. For example, as mentioned above, in the first and second reaction force calculation units 31 and 32, when the reaction force additional conditions are satisfied (L<L1, L<L2), the target pedal additional reaction forces $\tau p$ and $\tau m$ are generated and increased. From such matter, it is predicted that the reaction force shifts when the target pedal additional reaction forces $\tau p$ and $\tau m$ are generated. Moreover, it is predicted that the reaction force shifts when the arithmetic operations of the target pedal additional reaction forces $\tau p$ and $\tau m$ are started, or when these values rise.

Figure 15:
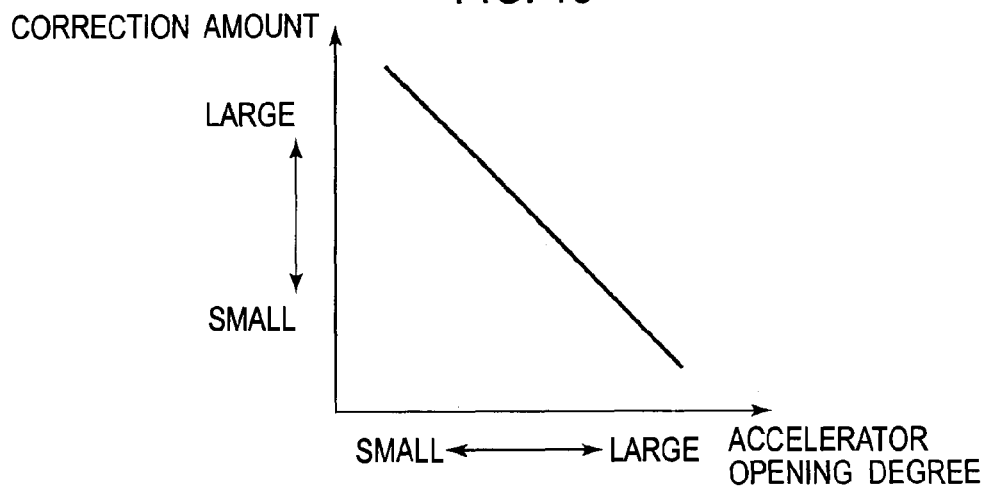
FIG. 15 is a characteristic chart showing a relationship between an accelerator opening degree and a correction amount.

(7) The correction amounts (first correction amount, second correction amount) can also be set based on the accelerator opening degree. FIG. 15 shows an example of this case. As shown in FIG. 15, such a correction amount is reduced as the accelerator opening degree is larger. Here, as the accelerator opening degree is larger, the approaching degree to the forward object is increased, and the risk degree is increased. Therefore, as the accelerator opening degree is larger, the correction amount is reduced, and the reaction force corrected to be reduced is ensured as a larger value, whereby large reaction force can be added correspondingly to such a situation where the risk degree is high.

Figure 16:
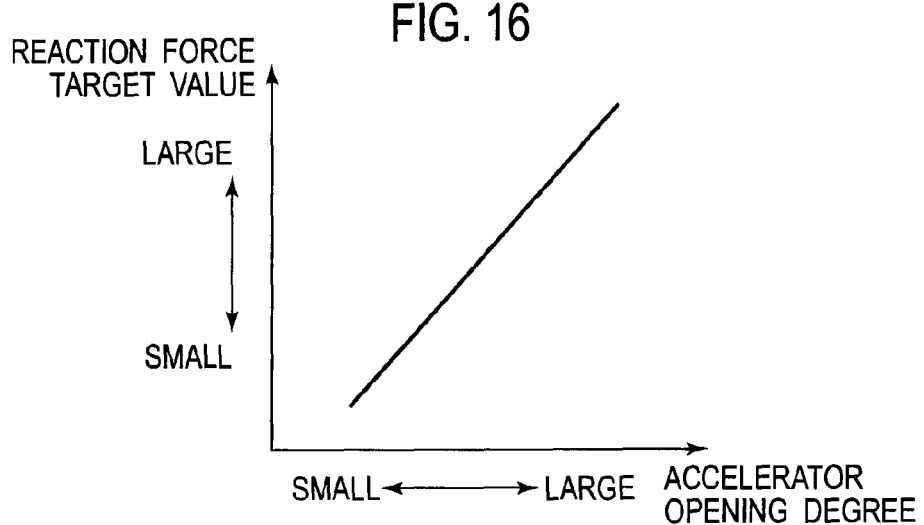
FIG. 16 is a characteristic chart showing a relationship between the accelerator opening degree and a limit value.

(8) The reaction force target values (reaction force A, reaction force C) can also be set based on the accelerator opening degree. FIG. 16 shows an example of this case. As shown in FIG. 16, such a reaction force target value is increased as the accelerator opening degree is larger. In such a way, for example, the reaction force target value preset based on the accelerator opening degree can be allowed to correspond to each of the running circumstances.

Here, as the accelerator opening degree is larger, the approaching degree to the forward object is increased, and the risk degree is increased. Therefore, as the accelerator opening degree is larger, the reaction force target value is increased, and each of the reaction forces (reaction force A, reaction force C) is ensured as a larger value, whereby large reaction force can be added correspondingly to the situation where the risk degree is high.

Figure 17:
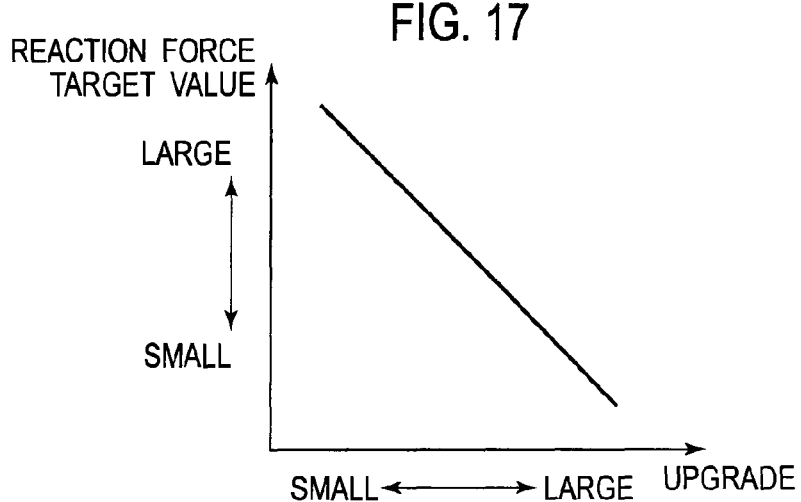
FIG. 17 is a characteristic chart showing a relationship between an upgrade and the limit value.

(9) The reaction force target values (reaction force A, reaction force C) can also be set based on an upgrade. FIG. 17 shows an example of this case. As shown in FIG. 17, such a reaction force target value is reduced as the upgrade is larger. In such a way, for example, the reaction force target value preset based on the upgrade can be allowed to correspond to each of the running circumstances.

Here, in a sloping road in which the upgrade is large, the accelerator pedal is further depressed even at the same vehicle speed as that on a flatland. Therefore, in the sloping road in which the upgrade is large, the tread force (that is, usual reaction force) of the driver is large from the beginning. In this case, the driver feels that the reaction force to be added to the accelerator pedal is strong. Therefore, the reaction force target value is reduced as the upgrade is larger, whereby the reaction force that is based on the reaction force target value can be reduced as a whole, and the driver can be prevented from feeling that the reaction force is strong. Specifically, reaction force suitable for the accelerator pedal operation of the driver can be generated.

(10) The configuration of the accelerator pedal actuator 5 is not limited to the configuration shown in FIG. 12. In other words, other configurations can be adopted for the accelerator pedal actuator 5 as long as the additional reaction force can be generated. For example, the accelerator pedal actuator 5 may generate the additional reaction force by imparting rotational force to the rotation shaft of the accelerator pedal.

(11) In the above embodiment, the target pedal additional reaction force τp or τm is changed in response to the elapsed time from the point of time when the intervehicular distance becomes smaller than the second intervehicular distance threshold L2 or the first intervehicular distance threshold L1. As opposed to this, when the intervehicular distance is smaller than the second intervehicular distance threshold L2 or the first intervehicular distance threshold L1, the target pedal additional reaction force τp or τm can also be changed in response to the intervehicular distance. To be more specific, the target pedal additional reaction force τp or τm is increased as the intervehicular distance is shorter.

Note that, in the above embodiment, the first to third reaction force calculation units 31, 32 and 33 realize a running circumstance detection apparatus that detects two or more running circumstances.

Moreover, the final reaction force calculation unit 34, the accelerator pedal control device 4 and the accelerator pedal actuator 5 realize a reaction force generation apparatus. This reaction force generation apparatus generates the reaction force for the accelerator pedal based on the predetermined reaction force target value, which is differentiated according to the respective running circumstances detected by the running circumstance detection apparatus, based on the running circumstances.

Moreover, the final reaction force calculation unit 34 corresponds to a reaction force correction apparatus that realizes the processing of FIG. 10. In other words, in the case where it is predicted that the reaction force target value is increased based on the change of the running circumstances detected by the running circumstance detection apparatus, and the difference between the reaction force target value corresponding to the running circumstance after the change and the reaction force currently generated by the reaction force generation apparatus is less than the predetermined difference, the reaction force correction apparatus makes the correction to reduce the reaction force currently generated by the reaction force generation apparatus.

Here, the reaction force target value corresponding to the running circumstance after the change is the reaction force target value (reaction force A, reaction force C) calculated by the first reaction force calculation unit 31 or the second reaction force calculation unit 32. Then, in this case, the reaction force that becomes a subject to the reduction correction is the reaction force currently generated based on the target pedal additional reaction force calculated by the third reaction force calculation unit 33.

Moreover, the reaction force target value corresponding to the running circumstance after the change is the reaction force target value (reaction force A) calculated by the first reaction force calculation unit 31. Then, in this case, the reaction force that becomes the subject to the reduction correction is the reaction force currently generated based on the target pedal additional reaction force calculated by the second reaction force calculation unit 32 or the third reaction force calculation unit 33.

Effects of this Embodiment (1) The running circumstance detection apparatus detects two or more running circumstances. Moreover, based on the running circumstances detected by the running circumstance detection apparatus, the reaction force generation apparatus generates the reaction force for the accelerator pedal in the returning direction thereof based on the predetermined reaction force target value differentiated according to the running circumstances.

Then, the reaction force correction apparatus makes the correction to reduce the reaction force generated by the reaction force generation apparatus in the case where it is predicted that the reaction force target value is increased by the change of the running circumstances, and the difference between the reaction force target value corresponding to the running circumstance after the change and the reaction force currently generated is less than the predetermined difference. In such a way, the reaction force increased in response to the running circumstance can be clearly distinguished from the reaction force before the increase. As a result, the change of the running circumstances can be accurately transmitted to the driver through the reaction force to be imparted to the accelerator pedal.

(2) The reaction force correction apparatus makes the correction to reduce the currently generated reaction force so as to ensure the difference between the reaction force target value corresponding to the running circumstance after the change and the currently generated reaction force. In such a way, the change of the reaction force increased in response to the running circumstance after the change can be accurately transmitted to the driver.

(3) The reaction force correction apparatus makes the correction to reduce the reaction force currently generated by the reaction force generation apparatus if the priority to generate the reaction force in response to the running circumstance after the change is higher than the priority to generate the reaction force in response to the current running circumstances. In such a way, the correction to reduce the reaction force in consideration of the priority can be made. As a result, correction to reduce the reaction force as appropriate from a viewpoint of the priority can be made, and correction of the reaction force, which is more than necessary, can be prevented.

(4) When the risk degree in the running circumstances is high, the priority is higher than when the risk degree is low. In such a way, the correction to reduce the reaction force in consideration of the risk degree can be made. As a result, the correction to reduce the reaction force as appropriate from a viewpoint of the risk degree can be made, and the correction of the reaction force, which is more than necessary, can be prevented.

(5) The predetermined difference is set correspondingly to the reaction force target value corresponding to the running circumstance after the change. In such a way, the change of the reaction force when the running circumstances are changed can be increased so as to correspond to the reaction force target value generated based on the running circumstance after the change.

(6) The predetermined difference is set based on the accelerator opening degree. In such a way, the reaction force suitable for the risk degree can be generated.

(7) One running circumstance among the two or more running circumstances is the approaching degree between the vehicle and the object on the periphery thereof. At this time, the reaction force correction apparatus predicts that the reaction force target value generated by the reaction force generation apparatus is increased by the fact that the approaching degree between the vehicle and the object on the periphery thereof is changed. In such a way, it can be easily predicted that the reaction force target value is increased by the change of the running circumstances.

(8) The reaction force correction apparatus makes the correction to reduce the reaction force at the predetermined reduction rate. In such a way, the reaction force is gradually decreased, and accordingly, the change of the reaction force at the time of the reduction correction can be prevented from giving the driver a feeling of wrongness.

(9) The reaction force target value corresponding to each of the running circumstances is set based on the road gradient. In such a way, the reaction force suitable for the accelerator pedal operation of the driver can be generated.

(10) The reaction force target value corresponding to each of the running circumstances is set based on the accelerator opening degree. In such a way, the reaction force suitable for the risk degree can be generated.

The entire contents of a Japanese Patent Application No. P2009-079822 with a filing date of Mar. 27, 2009 and a Japanese Patent Application No. P2009-269902 with a filing date of Nov. 27, 2009 are herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A reaction force imparting system of a vehicle accelerator pedal, comprising:
   a running circumstance detection apparatus configured to detect two or more running circumstances of a vehicle;
   a reaction force generation apparatus configured to, depending on the running circumstance detected by the running circumstance detection apparatus, generate reaction force for an accelerator pedal in a returning direction thereof based on a predetermined reaction force target value, wherein the accelerator pedal is operated by tread force of a driver, and the predetermined reaction force target value is differentiated according to each of the running circumstances; and
   a reaction force correction apparatus configured to make correction to reduce the reaction force currently generated by the reaction force generation apparatus when it is predicted that the predetermined reaction force target value is increased by a change of a running circumstance detected by the running circumstance detection apparatus, and a difference between the predetermined reaction force target value corresponding to the running circumstance after the change and the reaction force currently generated by the reaction force generation apparatus is less than a predetermined difference.

2. The reaction force imparting system according to claim 1, wherein the reaction force correction apparatus is configured to make the correction to reduce the reaction force currently generated by the reaction force generation apparatus so that the difference between the predetermined reaction force target value corresponding to the running circumstance after the change and the reaction force currently generated by the reaction force generation apparatus can become equal to or more than the predetermined difference.

3. The reaction force imparting system according to claim 1, wherein the reaction force correction apparatus is configured to make the correction to reduce the reaction force currently generated by the reaction force generation apparatus if priority to generate the reaction force in response to the running circumstance after the change is higher than priority to generate the reaction force in response to a current running circumstance.

4. The reaction force imparting system according to claim 3, wherein the priority is higher when a risk degree in the running circumstances is high than when the risk degree is low.

5. The reaction force imparting system according to claim 1, wherein the predetermined difference is set correspondingly to the predetermined reaction force target value corresponding to the running circumstance after the change.

6. The reaction force imparting system according to claim 1, wherein the predetermined difference is set based on an accelerator pedal opening.

7. The reaction force imparting system according to claim 1, wherein one running circumstance among the two or more running circumstances is a circumstance in which an approaching degree between the vehicle and an object on a periphery of the vehicle has reached a predetermined approaching degree, and the other running circumstance is not based on the approaching degree between the vehicle and the object, and
   the reaction force correction apparatus is configured to predict that the predetermined reaction force target value is increased when it is predicted that, depending on the approaching degree between the vehicle and the object, the running circumstance detected by the running circumstance detection apparatus is changed from the other running circumstance to the one running circumstance.

8. The reaction force imparting system according to claim 1, wherein the reaction force correction apparatus is configured to make the correction to reduce the reaction force at a predetermined reduction rate.

9. The reaction force imparting system according to claim 1, wherein the predetermined reaction force target value corresponding to each of the running circumstances is set based on a road gradient.

10. The reaction force imparting system according to claim 1, wherein the predetermined reaction force target value corresponding to each of the running circumstances is set based on an accelerator pedal opening.

11. A reaction force imparting method of a vehicle accelerator pedal, comprising:
   depending on two or more running circumstances of a vehicle, generating reaction force for an accelerator pedal in a returning direction thereof based on a predetermined reaction force target value, wherein the accelerator pedal is operated by tread force of a driver, and the predetermined reaction force target value is differentiated according to each of the running circumstances; and
   making correction to reduce the currently generated reaction force when it is predicted that the predetermined reaction force target value is increased by a change of a running circumstance, and a difference between the predetermined reaction force target value corresponding to the running circumstance after the change and the currently generated reaction force is less than a predetermined difference.

12. A reaction force imparting system of a vehicle accelerator pedal, comprising:
   running circumstance detection means for detecting two or more running circumstances of a vehicle;
   reaction force generation means that, depending on a running circumstance detected by the running circumstance detection means, generates reaction force for an accelerator pedal in a returning direction thereof based on a predetermined reaction force target value, wherein the accelerator pedal is operated by tread force of a driver, and the predetermined reaction force target value is differentiated according to each of the running circumstances; and reaction force correction means for making correction to reduce the reaction force currently generated by the reaction force generation means when it is predicted that the predetermined reaction force target value is increased by a change of the running circumstance detected by the running circumstance detection means, and a difference between the predetermined reaction force target value corresponding to the running circumstance after the change and the reaction force currently generated by the reaction force generation means is less than a predetermined difference.

13. A reaction force imparting system of a vehicle accelerator pedal, comprising:

a running circumstance detection apparatus configured to detect running circumstances of a vehicle, the running circumstances comprising: an approaching degree between the vehicle and an object on a periphery of the vehicle; and a circumstance where an accelerator pedal stroke exceeds a predetermined threshold;

a reaction force generation apparatus configured to, depending on a running circumstance detected by the running circumstance detection apparatus, generate reaction force for an accelerator pedal in a returning direction thereof based on a predetermined reaction force target value, wherein the accelerator pedal is operated by tread force of a driver, and the predetermined reaction force target value is differentiated according to each of the running circumstances; and a reaction force correction apparatus that is configured to make correction to reduce the reaction force currently generated by the reaction force generation apparatus when it is predicted that the predetermined reaction force target value is increased by a change of the running circumstance detected by the running circumstance detection apparatus, and a difference between the predetermined reaction force target value corresponding to the running circumstance after the change and the reaction force currently generated by the reaction force generation apparatus is less than a predetermined difference.

* * * * *